United States Patent [19]
Larson et al.

[11] Patent Number: 5,254,151
[45] Date of Patent: Oct. 19, 1993

[54] GLASS BATCH CHARGER HAVING SEALS WHICH PREVENTS ACCUMULATION OF BATCH

[75] Inventors: Edward W. Larson; Thomas H. Gould, both of Washington, Pa.

[73] Assignee: Frazier-Simplex, Inc., Washington, Pa.

[21] Appl. No.: 893,207

[22] Filed: Jun. 2, 1992

[51] Int. Cl.⁵ .............................................. C03B 3/00
[52] U.S. Cl. ................................. 65/335; 373/33; 373/34; 414/166; 414/187
[58] Field of Search ................... 373/33, 34; 414/166, 414/187, 198; 65/335, 27; 49/381, 399

[56] References Cited

U.S. PATENT DOCUMENTS

| | | | |
|---|---|---|---|
| 3,780,889 | 12/1973 | Frazier et al. | 65/335 |
| 3,868,031 | 2/1975 | Frazier et al. | 65/335 |
| 4,197,109 | 4/1980 | Frazier et al. | 65/335 |
| 4,226,564 | 10/1980 | Takahashi | 65/335 |
| 4,438,597 | 3/1984 | Maggart | 49/399 |
| 4,983,206 | 1/1991 | Trunzo | 65/27 |
| 5,073,183 | 12/1991 | Hammond et al. | 65/335 |

FOREIGN PATENT DOCUMENTS 2114968  9/1983  United Kingdom ................. 65/335

Primary Examiner—W. Gary Jones
Assistant Examiner—John Hoffmann
Attorney, Agent, or Firm—Webb, Burden, Ziesenheim & Webb

[57] ABSTRACT

A batch charger for a molten glass furnace comprising a stationary hopper having an inlet opening at the upper end and an outlet opening at the lower end. A reciprocable charger plate located below the outlet opening of the hopper to supply material from the hopper to the furnace. The charger plate has a bottom wall and upstanding sidewalls at the edges of the bottom wall which are outwardly spaced from the sidewalls of the hopper. An adjustable seal is attached to the rear wall of the hopper with a lower edge located below the lower edge of the rear wall of the hopper and depending flapper members are pivotally attached to the front wall of the hopper at each edge to prevent loose material from passing between the sidewalls of the charger plate and the sidewalls of the hopper when the charger plate is reciprocated.

17 Claims, 2 Drawing Sheets

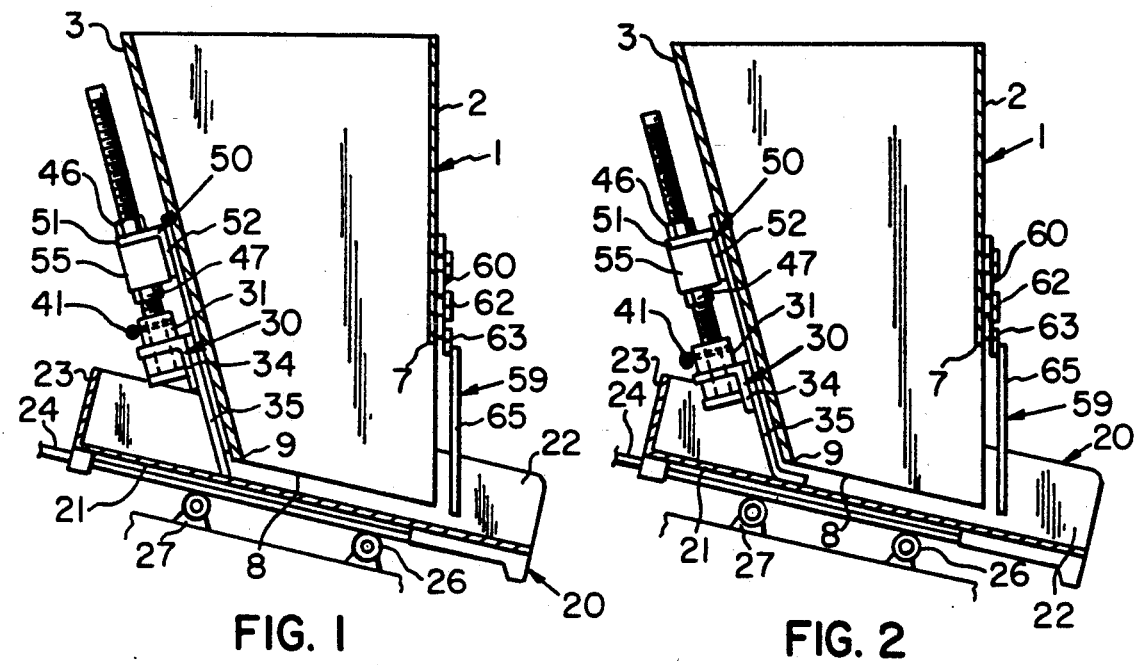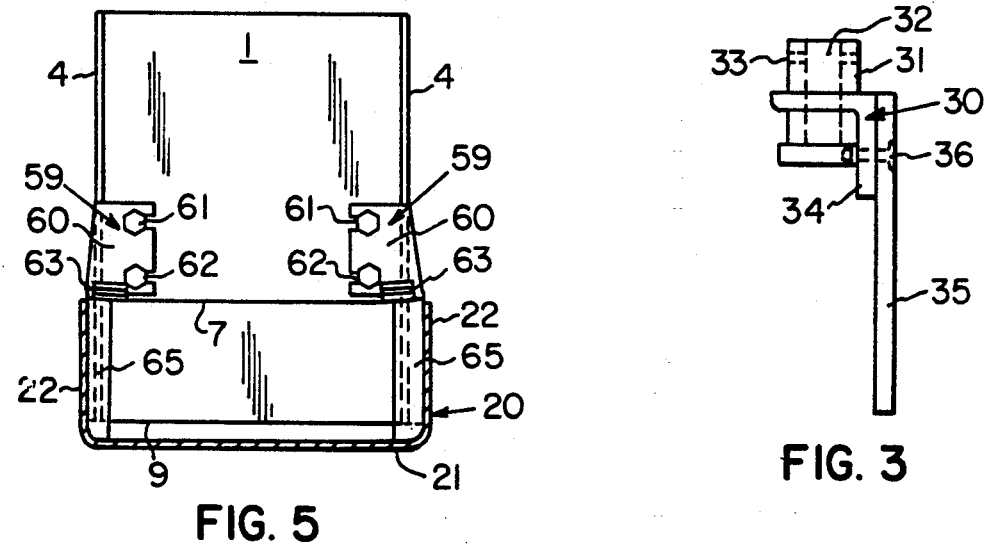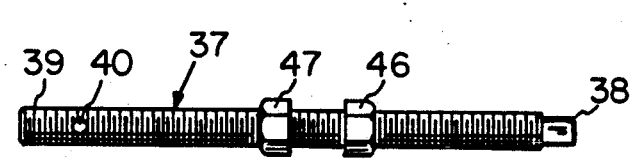

GLASS BATCH CHARGER HAVING SEALS WHICH PREVENTS ACCUMULATION OF BATCH

BACKGROUND OF THE INVENTION

1. Field of the Invention

The present invention relates generally to apparatus for charging raw batch material into a glass melting furnace and more particularly to a seal arrangement for a batch charger.

The invention is used with chargers such as those disclosed in U.S. Pat. Nos. 5,073,183; 4,983,206; 4,197,109 and 3,780,889, all of which are commonly owned with the present application. These patents disclose batch chargers for continuous glass melting furnances of the type having burners mounted along the opposed sidewallsand a batch charger located adjacent an end wall in an area referred to as the doghouse. A continuous glass melting furnace of this type comprises a large rectangular tank which contains a bath of molten glass. Raw batch material is continuously supplied to the upper surface of the bath by a batch charger. The doghouse area may extend along a substantial part of the width of the furnance end wall which may be up to 20 to 30 feet. A plurality of bath chargers may be arranged in the doghouse area in side-by-side relationship along the furnace end wall. The doghouse area of a furnace end wall typically includes a suspended wall located inwardly from the furnace end wall and having its lower end spaced above the upper edge of the furnace end wall to provide an acess opening therebetween. The access opening provided in the doghouse area extends downwardly opening into the furnance above the upper surface of the molten glass in the furnace onto which raw batch material is charged. The raw batch material will intially float on the upper surface of the molten glass and melt as it moves into the furnace away from the furnace end wall.

Conventional batch chargers include a reciprocable, water cooled, generally U-shaped charger plate that extends downwardly at an adjustable angle into the doghouse area of the furnace end wall. The charger plate is located below the discharge opening of a material supply hopper so that as the charger plate moves forward into the furnace from the retracted position, raw batch material is deposited from the hopper discharge opening in a layer onto the upper surface of the bottom wall of the charger plate. Simultaneously, the nose or forward edge of the charger plate pushes a previously deposited layer of batch material which is floating on the upper surface of the molten glass bath under the suspended wall at the end of the doghouse away from the furnace end wall into the melting zone of the furnace. As the charger plate retracts, the layer of batch material which has been deposited on the upper surface of the bottom wall of the charger plate is contacted by a seal member located at the rear wall of the hopper and is forced off the forward edge of the charger plate onto the open area on the upper surface of the molten glass bath from which the previous charge has been cleared. This reciprocating cycle of the charger plate is continuously repeated to maintain a substantially constant level or blanket of batch material on the upper surface of the molten glass bath, and hence, the level of the molten glass bath in the furnace is continuously maintained as glass is removed from the furnace.

When the charger plate is retracted in prior art arrangements, batch material remaining thereon could bypass the hopper in the spaces between the sidewalls of the hopper and the sidewalls of the U-shaped charger plate. This material accumulates behind the hopper and creates a problem during the continuous reciprocal motion of the charger plate.

The present invention solves the problem of accumulated batch material behind the hopper by providing an arrangement which prevents batch material from being drawn behind the hopper when the charger plate is retracted to receive a fresh batch of material from the discharge opening of the hopper. Additionally, the present invention provides for easy adjustment and replacement of the seal member which is necessary on a reoccurring basis.

SUMMARY OF THE INVENTION

The present invention provides an improved batch charger which includes a flexible seal member connected to the outer surface of the rear wall of the material supply hopper which can be readily adjusted relative to the upper surface of the bottom wall of the reciprocating charger plate and which can be easily replaced when necessary. A depending flapper member is provided at each edge of the front wall of the hopper to close the spaces between the sidewalls of the hopper and the sidewalls of the charger plate and thereby prevent batch material from being carried behind the hopper during retraction of the charger plate. Each flapper member is pivotally mounted to raise as the charger plate moves forwardly into the furnace and to lower as the charger plate retracts away from the furnace to its rearward position. The flapper members can be quickly and inexpensively installed on existing batch chargers without any modification of the hopper or the charger plate and are inexpensive to maintain.

A complete understanding of the invention will be obtained from the following description when taken in connection with the accompanying drawings wherein like reference characters identify like parts throughout.

BRIEF DESCRIPTION OF THE DRAWINGS

FIG. 1 is a vertical section through the hopper and the charger plate including a seal member and a flapper member;

FIG. 2 is a section similar to FIG. 1 showing the seal member in the lower position;

FIG. 3 is an elevation of a seal bracket having a seal member attached thereto;

FIG. 4 is a side view of a threaded adjusting rod for the bracket shown in FIG. 3;

FIG. 5 is a front elevation of the hopper and the charger plate;

DESCRIPTION OF THE PREFERRED EMBODIMENT

Figure 6:
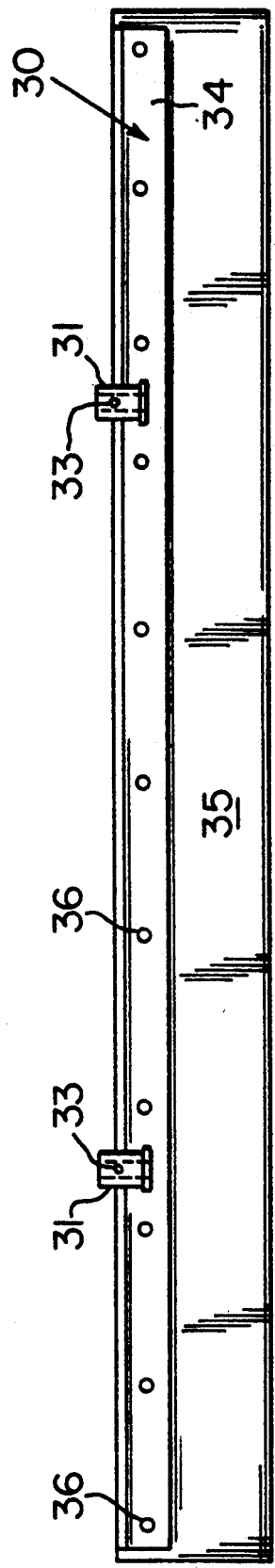
FIG. 6 is a rear elevation of the seal bracket and seal member shown in FIG. 3.
Figure 7:
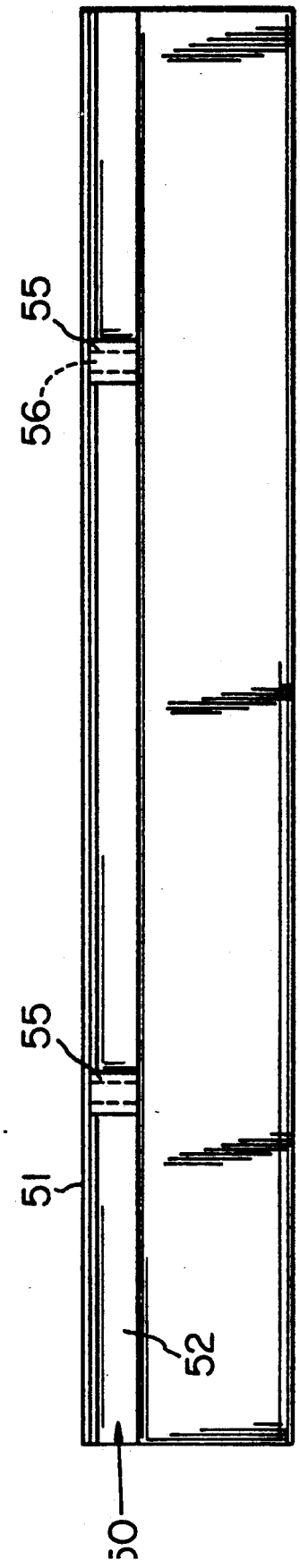
FIG. 7 is a rear elevation of the mounting bracket for the seal bracket shown in FIGS. 3 and 6.

With reference to FIGS. 1 and 2 of the drawings, it will be seen that a material supply hopper 1 has a substantially vertical front wall 2, a rear wall 3 and spaced sidewalls 4 connecting the edges of the front and rear walls. Front wall 2 has a lower edge 7 spaced above the lower edges 8 of sidewalls 4 and the lower edge 9 of rear wall 3. The rear wall is angled relative to front wall 2 to permit batch material supplied to the open upper end of hopper 1 to move through the discharge opening at the bottom of the hopper by gravity onto the upper surface of the bottom wall 21 of a water cooled reciprocal charger plate 20 which is located below the hopper discharge opening. The charger plate is shown schematically and has spaced, substantially parallel sidewalls 22 at opposite edges of bottom wall 21 and a rear wall 23 connecting the rear ends of the sidewalls. The spacing between sidewalls 22 is sufficient to receive the lower end of hopper 1 with a space between the inner surface of each charger plate sidewall 22 and the outer surface of each hopper sidewall 4. As is well-known to those skilled in the art and as disclosed in the prior art patents referenced herein, charger plate 20 reciprocates along its longitudinal length to supply batch material from the discharge opening of hopper 1 to the upper surface of the molten glass bath in a glass melting furnace (not shown). The front end or nose of charger plate 21 is unobstructed to permit batch material to fall off the bottom wall of the charger plate onto the upper surface of the molten glass bath.

As is also well-known to those skilled in the art, rearward movement of charger plate 20 causes batch material to drop off the unobstructed forward end of the bottom wall onto the upper surface of the molten glass bath. When the desired rearward position of the charger plate is reached, the mechanical drive unit (not shown) which reciprocates the charger plate reverses to begin the forward stroke. During the forward stroke, the previously deposited batch material is pushed forward on the upper surface of the molten glass toward the furnace interior by the nose of the charger plate. The complete travel distances of the charger plate are determined by adjusting the mechanical drive unit as is well-known to those skilled in the art.

The charger plate is reciprocated by a connecting rod 24 and an adjustable crank which extends from the mechanical drive unit and is connected to rear wall 23 of the charger plate. The lower surface of the bottom wall of the charger plate is supported on spaced rollers 26 which are mounted in brackets 27 attached to the top of the charger support structure.

The seal member and seal bracket are shown in detail in FIGS. 3 and 6 of the drawings and include an elongated right angle seal bracket 30 having a plurality of spaced sockets 31 attached thereto. Each socket has a longitudinal bore 32 and diametrically aligned holes 33 are drilled through opposed walls of the socket for a purpose to be described hereinafter. A flexible seal member 35 having a length substantially coextensive with right angle bracket 30 is attached to the vertical leg 34 of the right angle seal bracket by a plurality of spaced bolts 36.

An elongated adjustment rod 37 is shown in FIG. 4 of the drawings. Rod 37 is threaded throughout its length and has a flat portion 38 at one end. The end of the portion 39 of an adjustment rod 37 is inserted in a socket 31 on right angle seal bracket 30 as shown in FIGS. 1 and 2 of the drawings. A hole 40 is drilled through portion 39 of adjustment rod 37 adjacent one end of portion 39. When the portion 39 of a rod 37 is in a bore 32 of a socket 31, the hole 40 is aligned with holes 33 in socket 31 and a lock pin 41 is inserted through the holes in the socket and the hole in the adjustment rod to fix the adjustment rod in position in the socket.

A right angle mounting bracket 50 is attached to the outer surface of rear wall 3 of material supply hopper 1. This mounting bracket has a horizontal leg 51 and a vertical leg 52. A plurality of sockets 55 are spaced along bracket 50 so as to be in alignment with sockets 31 on right angle seal bracket 30. Each socket 55 has a longitudinal through bore 56 to freely receive the larger diameter portion of adjustment rod 37. An upper adjustment nut 46 and a lower adjustment nut 47 are threaded on threaded adjustment rod 37. One end of lower adjustment nut 47 is adapted to contact the bottom of socket 50 and one end of upper adjustment nut 46 is adapted to contact the upper surface of horizontal leg 51 of mounting bracket 50 as shown in FIGS. 1 and 2 of the drawings. Rotation of adjustment nuts 46 and 47 with lock pin 41 in place to fix adjustment rod 37 to right angle seal bracket 30 will raise and lower bracket 30 and the attached flexible seal member 35 relative to material supply hopper 1 and the upper surface of the bottom wall of charger plate 20. In the lower position shown in FIG. 2 of the drawings, the flexible seal member contacts the upper surface of bottom wall 21 of charger plate 20 and is deformed to a location below the lower edge of rear wall 3 of the hopper. In the upper position shown in FIG. 1 of the drawings, the lower edge of flexible seal member 35 is spaced a short distance above the upper surface of bottom wall 21 of charger plate 20.

FIG. 5 of the drawings shows the front of hopper 1 with a flapper assembly 59 mounted adjacent each outer edge of front wall 2. Each flapper assembly consists of a mounting plate 60 having space U-shaped open ended slots 61 which receive mounting bolts 62 which are threaded into front wall 2 of the material supply hopper so that the bolt heads hold the mounting plate in place. The mounting brackets are opposite hand as they are located at the opposite edges of the hopper. A hinge 63 has its upper leaf attached to the lower end of each mounting plate 60. An elongated flapper member 65 is attached to an depends from the lower leaf of each hinge 63 so that it can pivot relative to the upper leaf and the front wall of material supply hopper 1 as charger plate 20 reciprocates relative to the hopper. Thus, when the charger plate moves in the forward direction toward the furnace, flapper members 65 pivot toward the furnace and when charge plate 20 moves in the rearward direction away from the furnace, flapper members 65 pivot toward the rear of the hopper to seal the spaces between the outer surfaces of sidewalls 4 of the hopper and the inner surfaces of sidewalls 22 of the charger plate to prevent loose material from moving behind the hopper.

When a flexible seal member is to be attached to hopper 1, the hopper must be filled with batch material so that the batch material is piled on the charge plate because the flexible seal member is made from a rubber which is not heat resistant. The seal is attached to a seal bracket 30 by bolts 36 and the seal bracket is connected to adjusting rods 37 which are in place in sockets 55 on mounting bracket 50. Lock pins 41 are then inserted in holes 33 and bores 40 to fix the seal brackets in sockets 31. The adjusting rods are adjusted in mounting brackets 50 by nuts 46 and 47 so that the lower edge of flexible seal member 35 is spaced above the bottom of the upper surface of bottom wall 21 of charger plate 20. The seal member is then moved downwardly to touch the upper surface of the bottom wall of the charger plate as shown in FIG. 1 of the drawings after which it is moved downwardly by an additional amount to the position shown in FIG. 2 of the drawings. When the seal member is to be raised, lower adjustment nuts 47 are loosened and upper adjustment nuts 46 are tightened on adjustment rods 37. The reverse is true when the seal member is to be lowered, i.e., upper adjustment nuts 46 are loosened and lower adjustment nuts 47 are tightened on adjustment rods 37.

In order to replace a seal member, lower nuts 47 are lowered as far as possible on rods 37 and upper nuts 46 are tightened on rods 37 as far as possible. The quick release lock, pins 41 are removed and the seal bracket 30 will drop off the lower ends of adjustment rods 37.

While a specific embodiment of the invention has been described in detail herein, it will be appreciated by those skilled in the art that various modifications and alternatives to those details could be developed in light of the overall teachings of the disclosure. Accordingly, the particular arrangement is illustrative only and is not limiting as to the scope of the invention which is to be given the full breadth of the appended claims and any and all equivalents thereof.

I claim:

1. Apparatus for charging batch material to a molten glass furnace comprising a stationary material supply hopper having a front wall with vertical edges, a rear wall with vertical edges and opposed sidewalls connecting a vertical edge of said front wall and an inclined edge of said rear wall, a batch material inlet opening at a upper end of said hopper and a batch material outlet opening at a lower end of said hopper, a reciprocable elongated charger plate having a bottom wall with an upper surface located below said outlet opening of said hopper to receive batch material from said outlet opening of said hopper and supply a batch material to the furnace, said reciprocable charger plate bottom wall having side edges and an upstanding sidewall connected at each of said side edges of said bottom wall substantially parallel with and spaced from said sidewalls of said hopper, means for reciprocating said charger plate relative to said stationary hopper, seal means located behind said hopper having a lower edge below the lower edge of said rear wall of said hopper, adjustable means for attaching said seal means to said rear wall of said hopper to adjust said lower edge of said seal means relative to said upper surface of said bottom wall of said charge plate and flapper means connected to said front wall of said hopper adjacent each of said vertical edges of said front wall to prevent loose material from passing between said upstanding sidewalls of said charger plate and said sidewalls of said hopper when said charger plate is reciprocated relative to said hopper, said flapper means including a plate attached to the outer surface of said front wall of said hopper adjacent one of said vertical edges of said front wall, hinge means attached to said mounting plate and a depending elongated flapper member pivotally attached to said hinge means to pivot relative to said hopper when said charger plate is reciprocated relative to said hopper, whereby said seal means and said flapper means prevent loose material from accumulating behind said rear wall of said hopper.

2. Apparatus as set forth in claim 1 wherein said hinge means has a first leaf attached to said mounting plate and a second leaf pivotally attached to said first leaf and said depending elongated flapper member is attached to and depends from said second leaf of said hinge means, whereby said depending elongated flapper member extends into the space between one of said hopper sidewalls and one of said upstanding sidewalls of said charger plate.

3. Apparatus as set forth in claim 1 wherein said seal means includes an elongated seal bracket, a plurality of sockets spaced along said elongated seal bracket, each of said sockets having a longitudinal bore a flexible seal member attached to and depending from said elongated seal bracket.

4. Apparatus as set forth in claim 3 wherein said flexible seal member is rubber.

5. Apparatus as set forth in claim 3 wherein said adjustable means for attaching said seal means to said rear wall of said hopper includes an elongated right angle mounting bracket attached to said rear wall of said hopper, a plurality of sockets spaced along said right angle mounting bracket in alignment with said sockets on said seal bracket and a plurality of elongated threaded rods, each of said rods having an end in a bore in one of said sockets on said seal bracket, the upper portion of each of said rods extending through a socket on said right angle mounting bracket and means on each of said threaded rods for moving said seal bracket and said flexible seal member relative to said hopper.

6. Apparatus as set forth in claim 5 wherein said means on each of said threaded rods are a pair of nuts threaded on said rod above and below each of said sockets on said right angle mounting bracket.

7. Apparatus as set forth in claim 6 including diametrically aligned holes through each of said sockets on said elongated seal bracket, a through bore in each of said rods adjacent to an end of said adjustment rod, whereby said holes in said socket and said through bore in said rod are aligned and a lock pin inserted through said holes and said through bore to fix said rod relative to said socket.

8. Apparatus as set forth in claim 5 including diametrically aligned holes through each of said sockets on said elongated seal bracket, a through bore in each of said rods and a lock pin extending through said holes and said through bore, whereby said lock pin fixes said rod in place in said socket on said seal bracket.

9. Apparatus as set forth in claim 8 wherein said means on each of said threaded rods are a pair of nuts threadedly received on said rod, one of said nuts located below said socket on said mounting bracket and the other of said nuts located above said mounting bracket, whereby rotation of said nuts on said rod moves said rod and said elongated seal bracket and said flexible seal member relative to said hopper to position the lower edge of said flexible seal member relative to said upper surface of said bottom wall of said charger plate.

10. Apparatus for charging batch material to a molten glass furnace comprising a stationary material supply hopper having a front wall with vertical edges, a rear wall with inclined edges and opposed substantially parallel sidewalls connecting a vertical edge of said front wall and an inclined edge of said rear wall, a batch material inlet opening at a upper end of said hopper and a batch material outlet opening at a lower end of said hopper, a reciprocable charger plate having a bottom wall with an upper surface located below said outlet opening of said hopper to receive batch material from said outlet opening of said hopper, said charger plate bottom wall having side edges and an upstanding sidewall at each of said side edges of said bottom wall substantially parallel with and spaced from said sidewalls of said hopper, means for reciprocating said charger plate relative to said stationary hopper, seal means located behind said hopper, means for attaching said seal means to said rear wall of said hopper whereby a lower edge of said seal means is located above the upper surface of said bottom wall of said charger plate, means for adjusting said seal means relative to said upper surface of said bottom wall of said charger plate and a mounting plate attached to the outer surface of said front wall of said hopper adjacent each of said vertical edges of said front wall, a hinge attached to each of said mounting plates, and an elongated flapper member attached to said hinge extending into the space between a sidewall of said hopper and an upstanding sidewall of said charger plate to prevent loose batch material from passing between said upstanding sidewalls of said charger plate and said sidewalls of said hopper when said charger plate is moved rearwardly relative to said hopper, whereby each of said elongated flapper members pivots with said hinge relative to said hopper when said charger plate is reciprocated relative to said hopper.

11. Apparatus as set forth in claim 10 wherein each of said hinges includes an upper leaf attached to said mounting plate and a lower leaf pivotally attached to said upper leaf, said elongated flapper member being attached to said lower leaf of said hinge.

12. Apparatus as set forth in claim 10 wherein said seal means includes an elongated seal bracket, spaced sockets attached to said elongated seal bracket, each of said sockets having a longitudinal bore and an elongated flexible seal member depending from said elongated seal bracket.

13. Apparatus as set forth in claim 12 wherein said means for attaching said seal means to said rear wall of said hopper includes an elongated right angle mounting bracket attached to said rear wall of said hopper, spaced sockets on said right angle mounting bracket aligned with said spaced sockets on said seal bracket and an elongated threaded rod having an end located in said bore in each of said spaced sockets on said seal bracket, the upper portion of each said rod extending through one of said sockets on said right angle mounting bracket and means on each said threaded rod for adjusting said seal bracket and said flexible seal member relative to said hopper.

14. Apparatus as set forth in claim 13 wherein said means on each said threaded rod are a pair of nuts threaded on said rod above and below each of said sockets on said right angle mounting bracket.

15. Apparatus as set forth in claim 14 including aligned holes through each of said sockets on said elongated seal bracket, a through bore adjacent the end of each said rod, whereby said holes in said socket and said through bore in said rod are aligned and a lock pin inserted through said holes and said through bore to fix said rod in said socket.

16. Apparatus as set forth in claim 13 including diametrically aligned holes through each of said sockets on said elongated seal bracket, a through bore adjacent an end of each said rod and a lock pin extending through said holes in said socket and said through bore in each said rod, whereby said lock pin retains said rod in said socket.

17. Apparatus as set forth in claim 16 wherein said means on each said threaded rod are a pair of nuts threadedly received on said rod, one of said nuts being located below said socket on said mounting bracket and the other of said nuts being located above said mounting bracket, whereby rotation of said nuts on said rod moves said rod and said elongated seal bracket and flexible seal member relative to said hopper.

* * * * *